US010829277B2

(12) United States Patent
Olarte

(10) Patent No.: US 10,829,277 B2
(45) Date of Patent: Nov. 10, 2020

(54) CONTAINER VENT, DISPENSER AND HOLDING SYSTEM

(71) Applicant: Stackcan LLC, Aventura, FL (US)

(72) Inventor: Alvaro Mauricio Olarte, Aventura, FL (US)

(73) Assignee: Stackcan LLC, Aventura, FL (US)

( * ) Notice: Subject to any disclaimer, the term of this patent is extended or adjusted under 35 U.S.C. 154(b) by 0 days.

(21) Appl. No.: 16/274,830

(22) Filed: Feb. 13, 2019

(65) Prior Publication Data

US 2019/0248552 A1    Aug. 15, 2019

Related U.S. Application Data

(60) Provisional application No. 62/629,757, filed on Feb. 13, 2018.

(51) Int. Cl.
*B65D 47/32* (2006.01)
*B65D 47/06* (2006.01)
(Continued)

(52) U.S. Cl.
CPC ........... *B65D 47/32* (2013.01); *B65D 1/0261* (2013.01); *B65D 25/20* (2013.01); *B65D 25/48* (2013.01);
(Continued)

(58) Field of Classification Search
CPC .............................. B65D 47/32; B67D 3/0051
(Continued)

(56) References Cited

U.S. PATENT DOCUMENTS 2,516,728 A * 7/1950 Smith .................... B65D 25/42
220/768
2,812,120 A * 11/1957 Beall, Jr. ................ B65D 47/06
222/481.5
(Continued)

FOREIGN PATENT DOCUMENTS

GB          2343443 A     4/2003

OTHER PUBLICATIONS

M.C. Song, et al., "Research on effects of injection process parameters on the molding process for ultra-thin wall plastic parts." Journal of Materials Processing Technology 187-188 (2007) 668-671 (Year: 2007).*
(Continued)

*Primary Examiner* — Patrick M. Buechner
*Assistant Examiner* — Michael J. Melaragno
(74) *Attorney, Agent, or Firm* — St. Onge Steward Johnston & Reens, LLC

(57) ABSTRACT

A container dispenser system including a container having an orifice. A first dispenser is fitted into the orifice having at least first and second openings, the first opening is configured to allow liquid to exit the container there through and the second opening is configured to allow fluid to enter the container there through. A second dispenser is configured to connect to the first opening in a using configuration. A recess is positioned in an outer surface of the container and the second dispenser is configured to fit into the recess in a storage configuration. The recess has two end portions and a centerline defined there between. At least one portion of the recess is curved such that the centerline curves at least once between the two end portions.

22 Claims, 9 Drawing Sheets

(51) Int. Cl.
*B65D 25/20* (2006.01)
*B65D 25/48* (2006.01)
*B65D 1/02* (2006.01)

(52) U.S. Cl.
CPC ........ *B65D 47/068* (2013.01); *B65D 2205/02* (2013.01)

(58) Field of Classification Search
USPC .................. 222/530, 468, 481.5, 538, 478
See application file for complete search history.

(56) References Cited

U.S. PATENT DOCUMENTS

| | | | | |
|---|---|---|---|---|
| 2,915,223 | A * | 12/1959 | Beall, Jr. | B65D 47/06 222/109 |
| 3,173,587 | A * | 3/1965 | Stearns | B65D 47/061 222/479 |
| 3,506,167 | A * | 4/1970 | Orr | B65D 23/04 215/309 |
| 3,717,289 | A | 2/1973 | Laurizio | |
| 3,858,766 | A * | 1/1975 | Schiemann | B65D 25/42 222/479 |
| 3,901,417 | A * | 8/1975 | Schiemann | B65D 1/20 222/479 |
| 4,273,265 | A | 6/1981 | Anderson | |
| D266,017 | S * | 8/1982 | Kellogg | 222/530 |
| 4,509,665 | A * | 4/1985 | Goodall | B65D 47/12 222/478 |
| 4,650,100 | A * | 3/1987 | Echazabal, Jr. | B65D 25/465 222/475 |
| 5,108,016 | A * | 4/1992 | Waring | B01F 15/04 220/219 |
| 5,110,013 | A * | 5/1992 | Clark | F16L 37/133 141/18 |
| 5,232,110 | A * | 8/1993 | Purnell | B65D 47/06 215/309 |
| 5,377,882 | A * | 1/1995 | Pham | B65D 47/04 222/479 |
| 5,400,928 | A | 3/1995 | Resnick | |
| 5,406,994 | A | 4/1995 | Mitchell et al. | |
| 5,433,346 | A * | 7/1995 | Howe | B65D 77/06 222/105 |
| 5,472,124 | A * | 12/1995 | Martushev | B65D 1/06 222/529 |
| 5,538,165 | A * | 7/1996 | Frohn | B29C 49/4802 222/479 |
| 5,597,097 | A * | 1/1997 | Morris | B65D 25/38 222/529 |
| 5,651,908 | A * | 7/1997 | Mansfield | B05B 9/0426 222/383.3 |
| 5,671,868 | A * | 9/1997 | Herr | B65D 25/46 141/1 |
| 5,711,355 | A * | 1/1998 | Kowalczyk | B65D 25/48 141/290 |
| 5,746,358 | A * | 5/1998 | Crosby | B65D 47/06 222/479 |
| 5,850,949 | A * | 12/1998 | Koerbel | B65D 1/20 222/475 |
| 5,897,035 | A * | 4/1999 | Schlomer | B65D 21/0231 222/479 |
| 5,924,608 | A * | 7/1999 | Chiu | B65D 25/2826 222/475 |
| 6,029,858 | A * | 2/2000 | Srokose | B65D 1/18 222/143 |
| 6,045,013 | A | 4/2000 | Yang | |
| 6,050,455 | A * | 4/2000 | Soehnlen | B65D 1/20 215/382 |
| 6,068,161 | A * | 5/2000 | Soehnlen | B65D 1/20 215/382 |
| 6,082,591 | A * | 7/2000 | Healey | B65D 1/023 222/158 |
| 6,196,425 | B1 | 3/2001 | Fielding et al. | |
| 6,230,944 | B1 * | 5/2001 | Castellano | B65D 47/243 222/481.5 |
| 6,360,924 | B1 | 3/2002 | Franzen | |
| 6,382,475 | B1 * | 5/2002 | Weikinger | B65D 25/42 222/479 |
| 6,494,344 | B1 * | 12/2002 | Kressel, Sr. | B67D 7/04 222/157 |
| 6,845,885 | B2 * | 1/2005 | Morgenroth | B65D 47/06 222/109 |
| 6,968,983 | B2 * | 11/2005 | Laible | B67D 7/0294 222/464.1 |
| 7,331,490 | B2 * | 2/2008 | Yamana | B65D 1/20 215/902 |
| 7,513,394 | B2 | 4/2009 | Bone | |
| 7,959,044 | B1 * | 6/2011 | Christian | B65D 1/20 215/902 |
| 8,091,744 | B2 | 1/2012 | Zwahlen | |
| 8,157,132 | B1 * | 4/2012 | Johnson | G05D 11/006 137/114 |
| 8,201,588 | B2 * | 6/2012 | Bonner | F04B 9/14 141/291 |
| 8,245,891 | B2 * | 8/2012 | Eriksen | B65D 47/40 222/478 |
| 8,578,974 | B2 * | 11/2013 | Bonner | F04B 9/14 141/198 |
| 8,640,930 | B2 * | 2/2014 | Nunez | B65D 77/225 222/1 |
| 8,662,359 | B1 | 3/2014 | Hickey | |
| 8,727,187 | B2 | 5/2014 | Magley, II | |
| 8,833,617 | B1 * | 9/2014 | Compton | B65D 47/065 222/153.14 |
| 8,910,835 | B2 | 12/2014 | Ouderkirk | |
| 9,096,357 | B2 * | 8/2015 | Brausen | B65D 47/32 |
| 9,669,972 | B2 | 6/2017 | Stratton | |
| 9,926,104 | B2 * | 3/2018 | Olarte | B65D 21/0202 |
| 10,273,056 | B2 * | 4/2019 | Hoffman | B65D 25/2826 |
| 2001/0054628 | A1 * | 12/2001 | Harbaugh | B65D 25/42 222/479 |
| 2005/0092780 | A1 * | 5/2005 | Yamana | B65D 1/20 222/478 |
| 2006/0081662 | A1 | 4/2006 | Miura | |
| 2009/0045226 | A1 * | 2/2009 | Munlin | B67D 7/00 222/158 |
| 2011/0233236 | A1 | 9/2011 | Brown et al. | |
| 2012/0193318 | A1 * | 8/2012 | Meager | B65D 23/04 215/40 |
| 2012/0228338 | A1 * | 9/2012 | Magley, II | B67D 7/005 222/481.5 |
| 2012/0280001 | A1 * | 11/2012 | Leadbeater | B65D 25/44 222/481.5 |
| 2013/0299522 | A1 * | 11/2013 | Magley, II | B65D 47/32 222/481.5 |
| 2014/0021222 | A1 * | 1/2014 | Forbis | B67D 7/005 222/153.14 |
| 2014/0144948 | A1 * | 5/2014 | Brausen | B65D 47/32 222/468 |
| 2014/0332568 | A1 * | 11/2014 | Stratton | B65D 47/32 222/481.5 |
| 2017/0029168 | A1 * | 2/2017 | Olarte | B65D 21/0202 |
| 2017/0297766 | A1 * | 10/2017 | Olarte | B65D 21/0202 |
| 2017/0327281 | A1 | 11/2017 | Cross | |

OTHER PUBLICATIONS

SureCan 5-Gallon Gas Can, Jan. 16, 2019, retrieved online from: https://www.kotulas.com/deals/ProductDisplay?catalogId=10602&storeId=10152&productId=56657&langId=-1&utm_source=google_pla&utm_medium=Tools-Garage-Fuel-Storage-Transfer&utm_content=61275&gclid=CjwKCAiAyfvhBRBsEiwAe2t_i7iC_kOrRXtnL5djH8I1fufL2rq8U1SwdytwWo5jJUdC2DS76B6zhhoCeBUQAvD_BwE.

* cited by examiner

CONTAINER VENT, DISPENSER AND HOLDING SYSTEM

FIELD OF THE INVENTION

The following relates to a vent, dispenser and holder for a container. More particularly, the following relates to a vent which can receive a dispenser tube which can be stored when not in use in a recess of the container. In certain aspects, the container is configured such that it can stack.

BACKGROUND OF THE INVENTION

Numerous containers have been designed in a manner that they can contain liquids and other materials therein. However, often times when a liquid is to be poured out of these containers, it is difficult to control the outflow because at the same time air must replace the emptied space where the liquid used to be. In this manner, air will enter the container as liquid leaves, many times through the same orifice. Depending on how fast the liquid is poured out or how much the container is tilted, the flow rate may not be constant due to the air constantly trying to catch up to the flow of liquid. This produces an effect which may be referred to as "glugging." Meaning, that the flow rate of liquid out the container experiences large fluctuations which make it difficult to accurately pour the liquid out of the container.

Furthermore, some containers such as gas cans have been designed to have a stow away tube, but the problem with many of these designs is that the tube is designed to be reversed and placed inside the container (with the gasoline) while in storage. When in use, the user takes the tube out and fastens it to the opening. While this may provide acceptable space minimization in storage, the fact that the liquid contacts the outer part of the tube means that the user will get their hands dirty by touching the tube and that gasoline in contact with the tube during storage will be exposed to the external environment, causing the user to touch the gasoline or at minimum experience an un-wanted smell.

Thus, it is desirable to provide a system for dispensing liquid from a container that is easy to use, avoids "glugging" (i.e. an un-even dispensing stream due to difficulty equalizing air pressure) and while at the same time being easy and convenient to store in a space saving manner.

SUMMARY OF THE INVENTION

Therefore, it is an object of the present invention to provide an easy to install vent system to enable smooth pouring of liquid out of a container.

It is a further object of the present invention to provide a dispenser that can be easily stored on the outside of the container when not in use but can be readily installed in a configuration to enable ease of pouring.

It is a further object of the present invention to provide for dispenser storage without requiring the dispenser to contact liquid in the container when in storage.

The terms "first" and "second" are used to distinguish one element, set, data, object or thing from another, and are not used to designate relative position or arrangement in time.

Therefore, one embodiment of the present invention a container dispenser system is provided. The system includes a container, a first dispenser, and a second dispenser. The container has an orifice and the first dispenser is fitted into the orifice. The first dispenser has at least first and second openings. The first opening is configured to allow liquid to exit the container there through and the second opening is configured to allow fluid to enter the container there through. The second dispenser is configured to connect to the first opening of the first dispenser in a using configuration. The container also has a recess positioned in an outer surface thereof, and the second dispenser is configured to fit into the recess in a storage configuration. The recess has two end portions and a centerline defined there between. At least one portion of the recess is curved such that the centerline curves at least once between the two end portions.

In some embodiments, the first dispenser fits into the orifice such that a cap can be attached to the container to seal the orifice with the first dispenser installed in the orifice.

In some embodiments, the system also includes a flange positioned on the first dispenser. The orifice has first and second sections, the first section positioned outwardly with respect to outward fluid flow from the container with respect to the second section. The first section has a diameter greater than a diameter of the second section such that the flange inserts partially into the orifice at the first section but is prohibited from being inserted into the orifice beyond a location where the first and second sections meet.

In some embodiments, the system also includes an extension in communication with the second opening of the first dispenser. The extension has a through-hole and extends from a bottom side of the first dispenser away from a top side of the first dispenser such that the fluid entering the second opening passes through both the second opening and the through-hole.

In some embodiments, the system also includes a hose located inside the container. The hose has a first end configured to be coupled to the extension of the first dispenser and a second end positioned in a handle of the container such that the fluid entering the second opening passes through the hose and is released inside the container at an area near the handle.

In some embodiments, the second dispenser includes a connector and a tube member. The connector is configured to insert at least partially into the first opening of the first dispenser and the tube member is connected to the connector opposite an end that inserts into the first opening. In some embodiments, the connector has a first section and a second section. The first section is configured to insert into the first opening of the first dispenser and the second section is configured to connect to the tube member. The first section has a first outer diameter greater than a second outer diameter of the second section. The second outer diameter is less than or equal to an inner diameter of the tube member such that the tube member receives the second section.

In some embodiments, the recess includes a center portion connected to the two end portions by two respective intermediate portions. Each of the two intermediate portions are at least partially curved such that the centerline of the recess curves at least twice between the two end portions.

In some embodiments, the system also includes at least two opposed undercut surfaces located on opposite sides of the recess such that upon insertion of the second dispenser past the at least two opposed undercut surfaces, the second dispenser is retained within the recess.

In some embodiments, the system also includes at least one clip configured to attach to the container transverse to the recess such that the at least one clip retains the second dispenser within the recess without interfering with the container being interlocked and stacked with a matching container.

In another embodiment of the present invention, a container vent dispenser is provided. The vent dispenser includes a body having a first side and a second side. The first side including at least first and second openings, both of which pass all the way through the body. The first opening is configured to allow liquid to exit the container there through and the second opening is configured to allow fluid to enter the container there through to equalize pressure due to the liquid that exits the first opening. The first side includes a flange that has a first diameter and a segment extending from the flange towards the second side. The segment has a second diameter smaller than the first diameter. The second side includes a first face with at least two voids therein. The at least two voids extending towards the first side a distance less than a distance between the first and second sides.

In some embodiments, the vent dispenser is configured to be fitting into an orifice of the container. The orifice has first and second sections. The first section positioned outwardly with respect to outward fluid flow from the container with respect to the second section. The first section has a diameter greater than a diameter of the second section such that the flange of the vent dispenser inserts partially into the orifice at the first section but is prohibited from being inserted into the orifice beyond a location where the first and second sections meet.

In some embodiments, the vent dispenser also includes an extension in communication with the second opening and extending from the second side away from the first side and having a through-hole such that the fluid entering the second opening passes through both the second opening and the through-hole.

In some embodiments, the at least two voids are sized and shaped such that a maximum wall thickness of the body is no more than 30% greater than a minimum wall thickness of the body.

In some embodiments, the vent dispenser also includes a spout configured to connect to the first opening in a using configuration. The spout has a connector and a tube member. The connector is configured to insert at least partially into the first opening and the tube member is connected to the connector opposite an end that inserts into the first opening. In some embodiments, the spout is configured to fit into a recess of the container in a storage configuration. The recess is positioned in an outer surface of the container and has two end portions and at least one curved portion there between such that the recess has a centerline that curves at least once between the two end portions. In other embodiments, the recess also includes at least two opposed undercut surfaces located on opposite sides of the recess such that upon insertion of the spout past the at least two opposed undercut surfaces, the spout is retained within the recess.

In an alternative embodiment of the present invention, a container for holding and dispensing liquid is provided. The container includes a hollow vessel, a vent dispenser, and a spout. The vessel has an orifice and the vent dispenser is fitted into the orifice. The vent dispenser includes a body having a first side and a second side. The first side includes at least first and second openings, both of which pass all the way through the body. The first opening is configured to allow liquid to exit the vessel there through and the second opening is configured to allow fluid to enter the vessel there through to equalize pressure due to the liquid that exits the first opening. A flange is positioned on the first side of the body such that the first side has a first diameter that is greater than a second diameter of the second side. The second side includes a first face having at least two voids therein. The at least two voids extending towards the first side a distance less than a distance between the first and second sides. The orifice includes first and second sections. The first section positioned outwardly with respect to outward liquid flow from the vessel with respect to the second section. The first section has a third diameter greater than a fourth diameter of the second section such that the flange of the vent dispenser inserts partially into the orifice at the first section but is prohibited from being inserted into the orifice beyond a location where the first and second sections meet. The spout is configured to connect to the first opening of the vent dispenser in a using configuration. The spout has a connector and a tube member. The connector is configured to insert at least partially into the first opening and the tube member is connected to the connector opposite an end that inserts into the first opening. The vessel also includes a recess that is positioned in an outer surface thereof. The spout is configured to fit into the recess in a storage configuration. The recess has two end portions and at least two curved portions there between such that the recess has a centerline that curves at least twice between the two end portions.

In some embodiments, the container also includes an extension in communication with the second opening of the vent dispenser. The extension has a through-hole and extends from the second side of the vent dispenser away from the first side of the vent dispenser such that the fluid entering the second opening passes through both the second opening and the through-hole.

In some embodiments, the container also includes at least two opposed undercut surfaces located on opposite sides of the recess such that upon insertion of the spout past the at least two opposed undercut surfaces, the spout is retained within the recess.

Other objects of the invention and its particular features and advantages will become more apparent from consideration of the following drawings and accompanying detailed description.

DETAILED DESCRIPTION OF THE INVENTION

Figure 1:
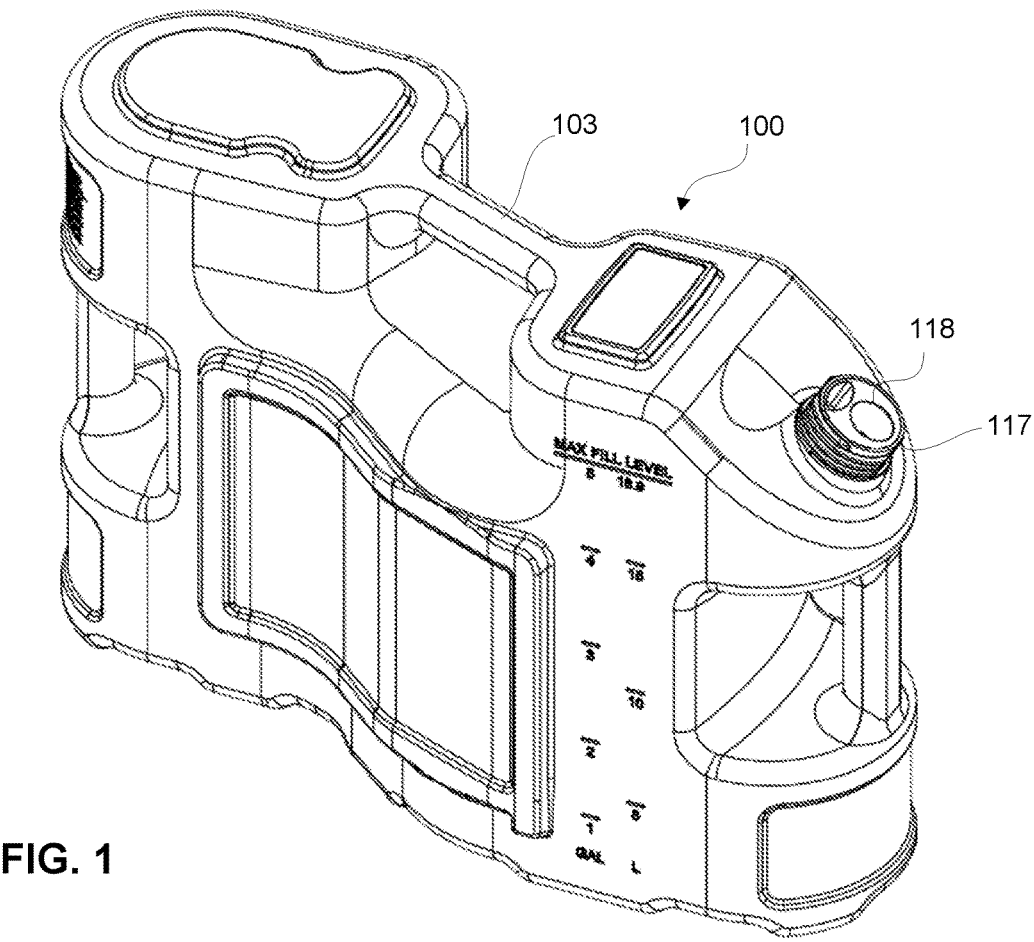
FIG. 1 is a perspective view of a container with the dispensing and storage system according to an embodiment of the present invention.

Referring now to the drawings, wherein like reference numerals designate corresponding structure throughout the views. The following examples are presented to further illustrate and explain the present invention and should not be taken as limiting in any regard.

Figure 2:
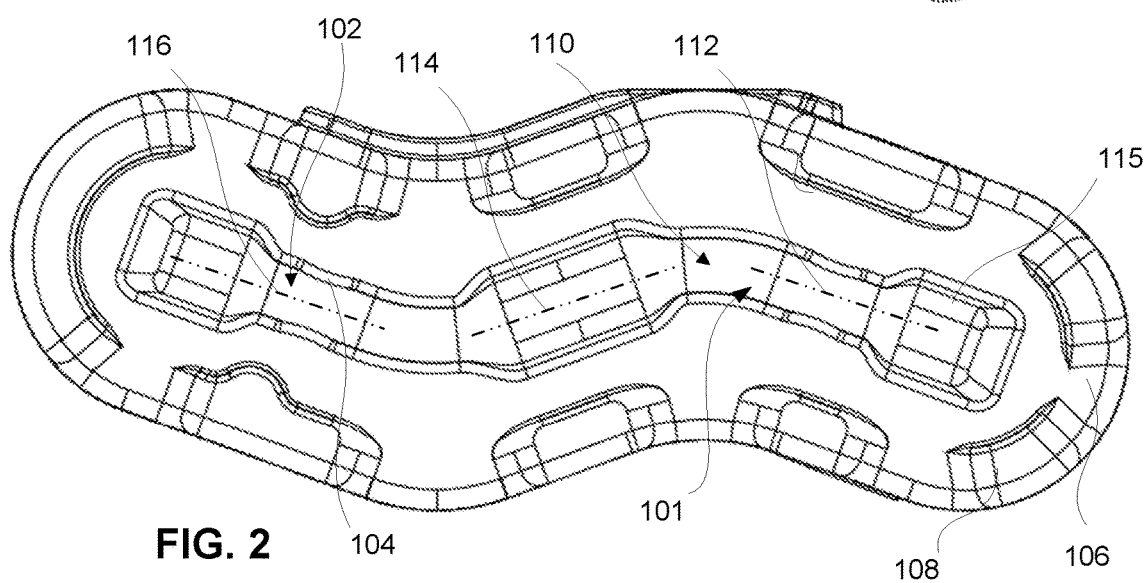
FIG. 2 is a bottom view of FIG. 1 with the dispensing tube removed.
Figure 8:
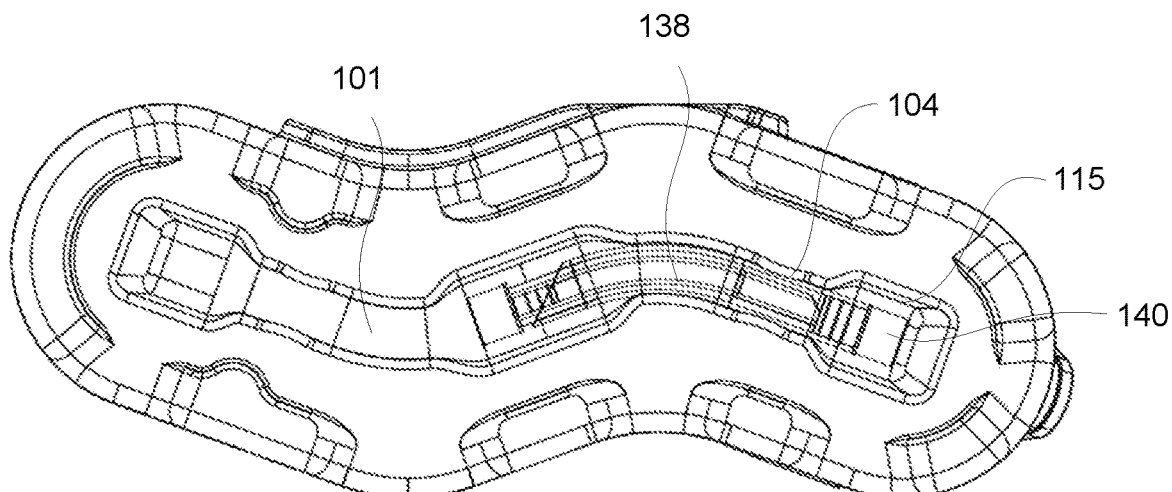
FIG. 8 is a bottom view of FIG. 1 with the dispensing tube in storage.

FIG. 1 shows a container 100 with a vent 118 installed in an orifice 117. The container 100 may be similar to that which is shown and described in U.S. Pat. No. 9,926,104, the contents of which are incorporated herein by reference. Particularly, the container 100 is of a generally undulating shape that enables a variety of features, such as interlocking and stacking with matching containers. As shown in FIG. 2, the bottom of the container 100 includes a recess 101, which has straight portions 102 and curved portions 110. The recess may also have only curved portions without straight portions. In the embodiment show, the three straight portions are shown with centerlines 116, 114, and 112. Centerlines 112 and 116 are parallel with each other, and centerline 114 of the center straight portion is at an angle (which is not flat—i.e. greater than 0 degrees and less than 180 degrees) to lines 112/116 such that centerline 114 is transverse to the other two. The sidewall of the recess 101 moves inward and outward relative to the centerlines to allow for the recess 101 to accommodate various fittings. For example, as shown in FIG. 8, protrusion 104 protrudes inward towards the centerline to help hold a tube 138 whereas section 115 is larger such that it may hold the tube connector 140, which allows for connection to the vent or alternately a dispenser nozzle such as a shower head or other dispenser nozzle. In some embodiments, the tube extends the majority of the length of the recess and section 115 can receive the dispenser nozzle which may be a shower head or other type of stream forming dispenser (e.g. flat, cone, spray, stream, etc.) or an appropriate nozzle for dispensing gas. This nozzle is fitted to the opposite end of the connector 140 which connects to the vent.

Figure 3:
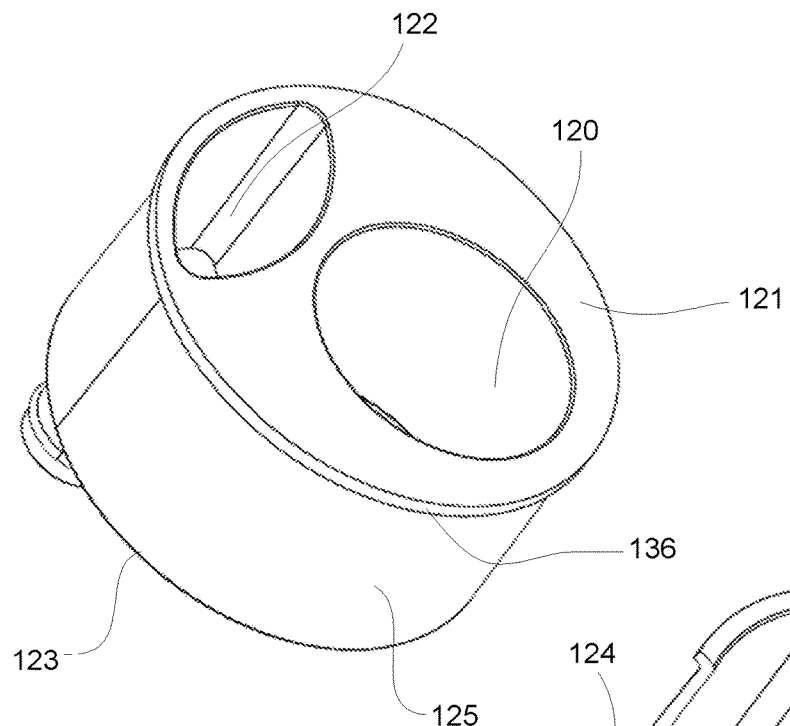
FIG. 3 is a top perspective view of the dispenser vent of FIG. 1
Figure 5:
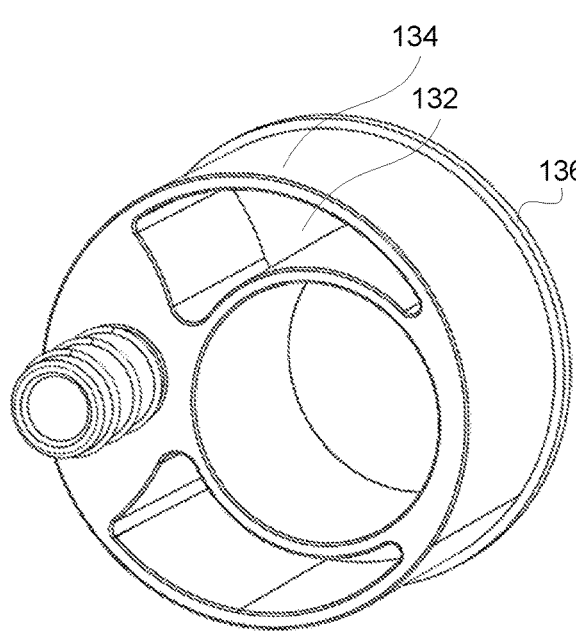
FIG. 5 is a bottom perspective view of the dispenser vent of FIG. 1
Figure 4:
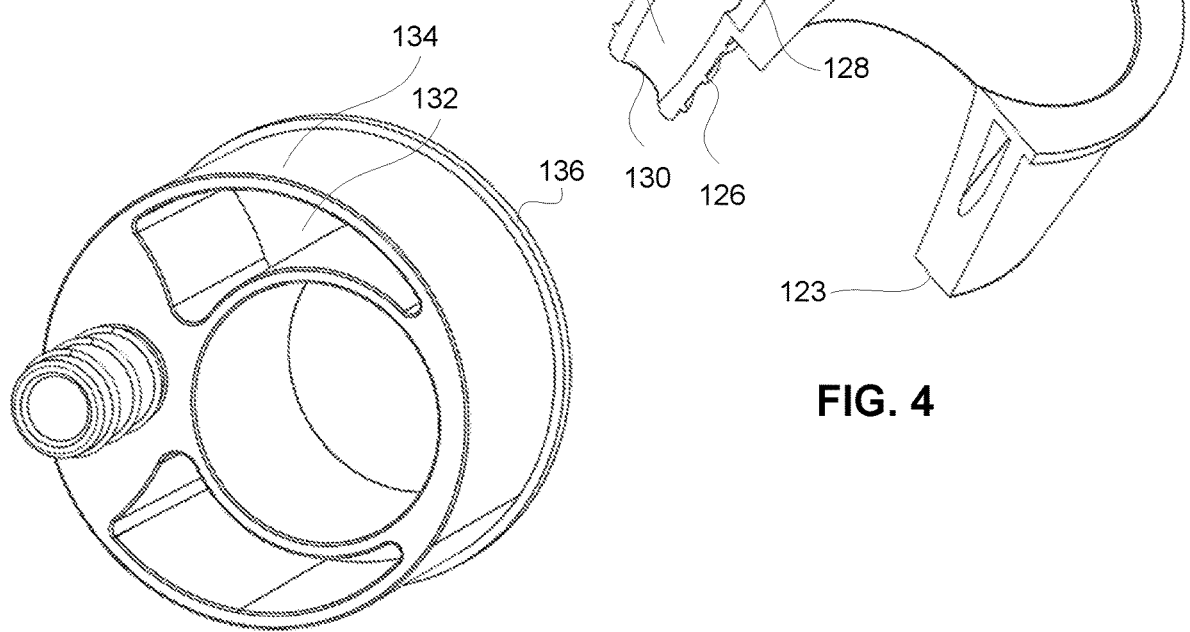
FIG. 4 is a section view of the dispenser vent of FIG. 1

FIGS. 3-5 show additional details of the vent 118. Two openings 122 and 120 are in an upper end 121 of the vent 118. Openings 122/120 extend all the way through the vent 118. Opening 120 is designed such that fluid exits the container 100 there through, whereas opening 122 allows air to enter the container 100 there through to equalize/relieve pressure and ensure an even flow of fluid. In some embodiments, opening 120 is inwardly tapered from lower end 123 to upper end 121, and opening 122 generally narrows from upper end 121 to lower end 123. The lower end 123 of the vent 118 includes voids 132 that do not pass all the way through the vent 118. This ensures that the thickness of walls of the vent at any one point is not so large that significant deformations occur during the injection molding process. In preferred embodiments, the voids 132 are sized and shaped such that a maximum wall thickness of the vent 118 is no more than 40% greater than a minimum wall thickness of the vent 118 in preferred embodiments, this ratio is no more than 30% or in even more preferred embodiments, no more than 20%.

Figure 19:
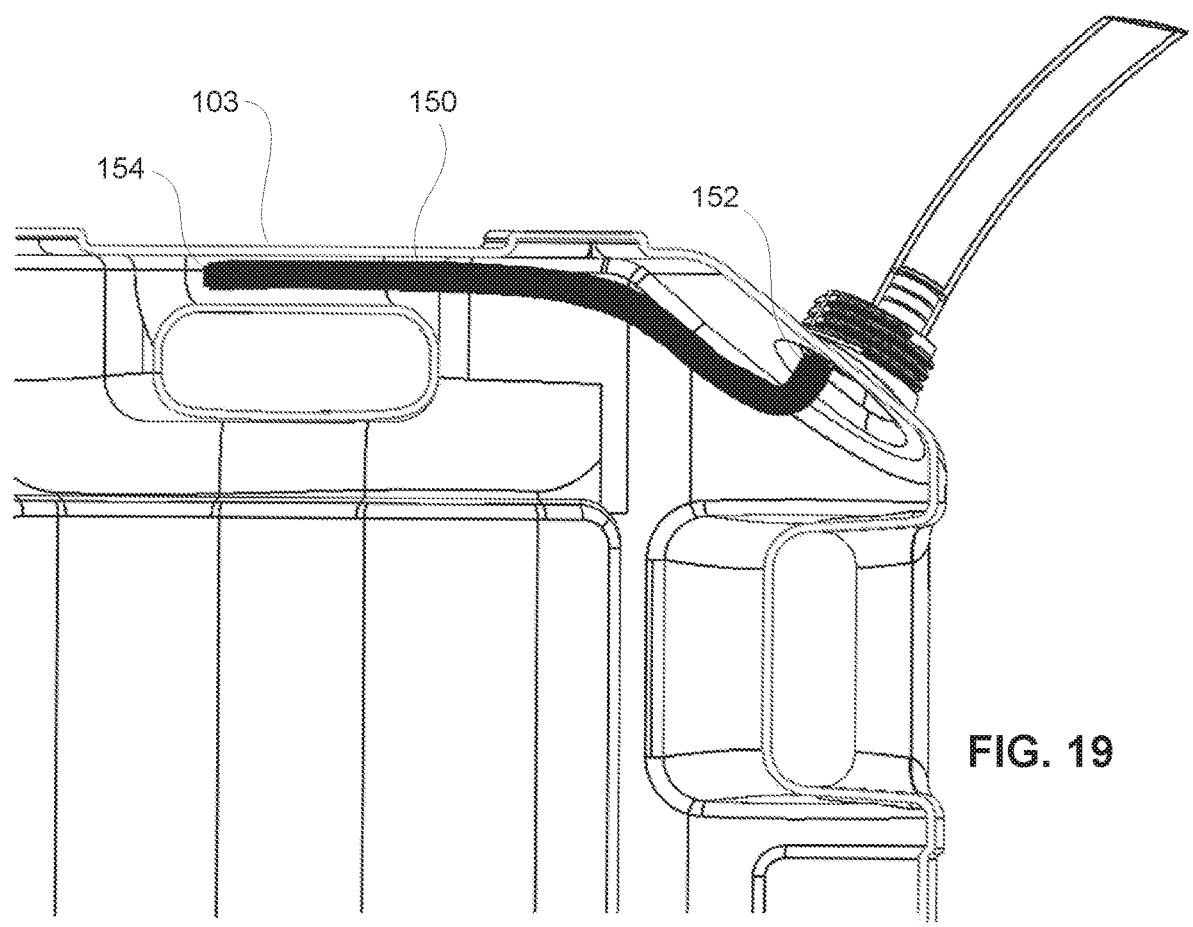
FIG. 19 is a detail section view of the container of FIG. 11 having an interior vent hose connected to the dispenser vent.

In some embodiments, the opening 122 has a lower spout 124 that preferably extends from the lower end 123 away from the upper end 121. The lower spout 124 has an upper hole 128, a lower hole 130, and outer ribs or rings 126. The outer ribs 126 are configured to secure to a vent hose 150, which is positioned inside the container 100 in some embodiments, as depicted in FIG. 19. The vent hose 150 has a first end 152 adapted to connect to the lower spout 124 of the vent 118, and a second end 154 that releases the air that passes through opening 122 into the container 100. Preferably, the vent hose 150 is long enough such that the second end 154 rests within a handle 103 of the container 100 to reduce the likelihood of liquid entering the vent hose 150 during pouring operations. In some embodiments, the vent hose 150 is preinstalled and partially secured to the interior wall of the container 100 such that a user can retract the first end 152 through the orifice 117 to connect the vent hose 150 to the vent 118. In other embodiments, the vent hose 150 is separate from the container 100 and has a flexible, yet rigid gooseneck-like structure such that the user connects the vent hose 150 to the vent 118 and bends the vent hose 150 to conform to the shape of the container 100 during installation of the vent 118 in orifice 117.

Figure 6:
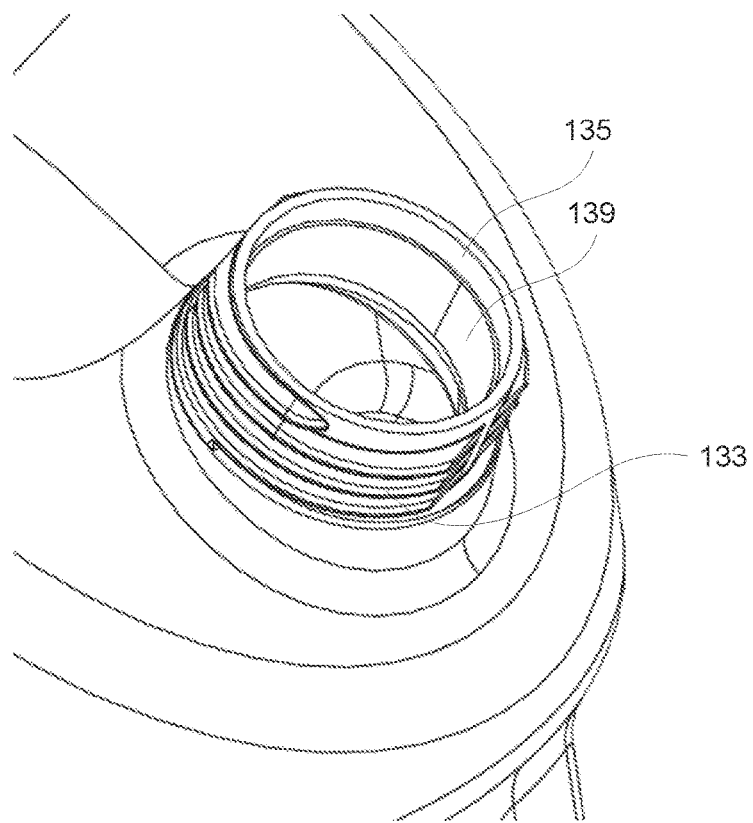
FIG. 6 is a detail perspective view of the container of FIG. 1
Figure 7:
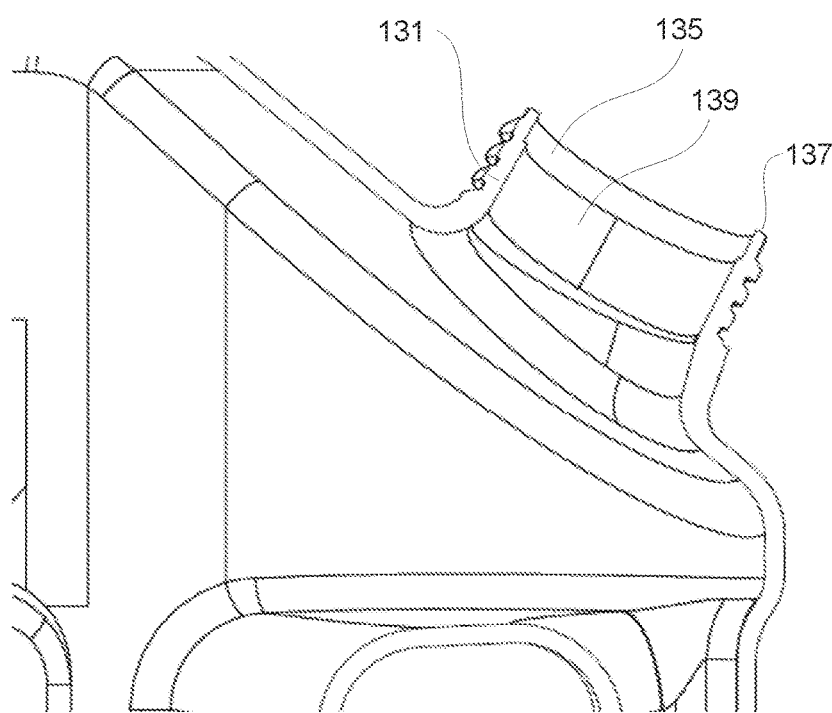
FIG. 7 is a detail section view of the container of FIG. 1
Figure 20:
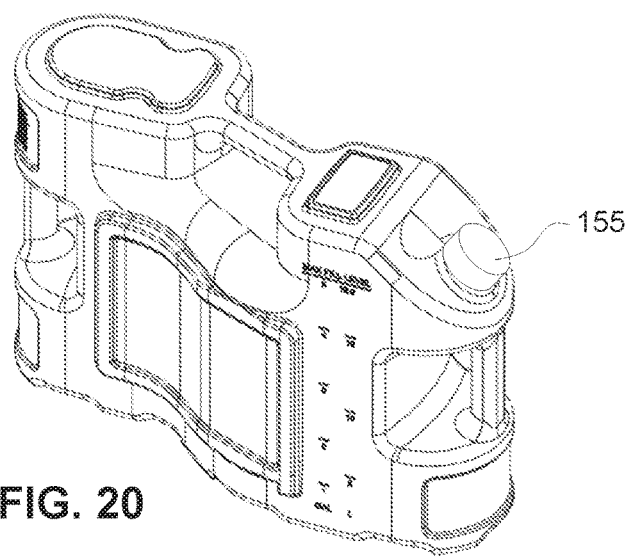
FIG. 20 is a perspective view of the container of FIG. 1 having the orifice sealed with a cap.

In preferred embodiments, the upper end 121 of the vent 118 has a circumferential flange 136 such that the upper end 121 has an outer diameter greater than an outer diameter of the body 125 of the vent 118. As shown in FIGS. 6-7, the orifice 117 is located in a bottle neck 131 of the container 100. Preferably, the bottle neck 131 has interior surfaces 135 and 139 arranged in a stepped configuration such that orifice 117 has a diameter at surface 135 that is greater than a diameter at surface 139. The vent 118 fits into the bottle neck 131 such that flange 136 fits in next to surface 135 but does not fit past surface 139 due to the stepped configuration. A seal is created between surface 139 and outer surface 134 of the vent body 125 and between flange 136 and surface 135. The seal or narrowed gaps are enough to ensure that liquid will be expelled out opening 120. In preferred embodiments, the flange 136 has a thickness that is less than or equal to the height of surface 135 such that the vent 118 is installed approximately flush to or below a top surface 137 of the bottle neck 131. Thus, after the vent 118 is installed in the orifice 117, a cap 155 can be secured to the bottle neck 131 to seal the container 100, as shown in FIG. 20. In some embodiments, the cap 155 is screwed on via threads 133. In other embodiments, the cap 155 snap-fits over surface 137.

Figure 9:
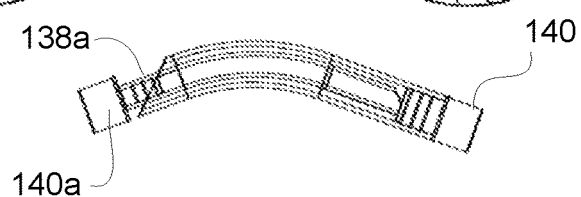
FIG. 9 is a plan view of the dispensing tube that can be installed in the container of FIG. 1 as shown in FIG. 8
Figure 10:
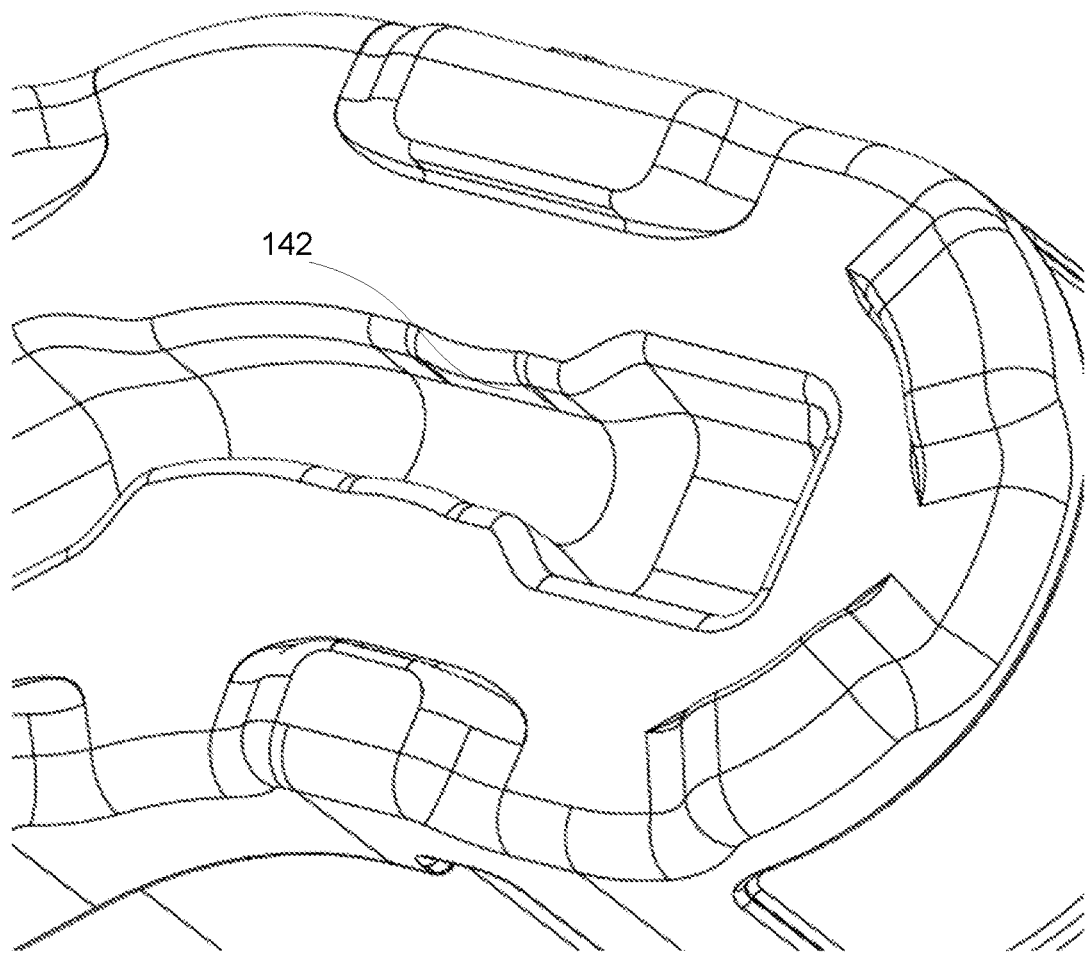
FIG. 10 is a detail bottom perspective view of the container of FIG. 1.
Figure 11:
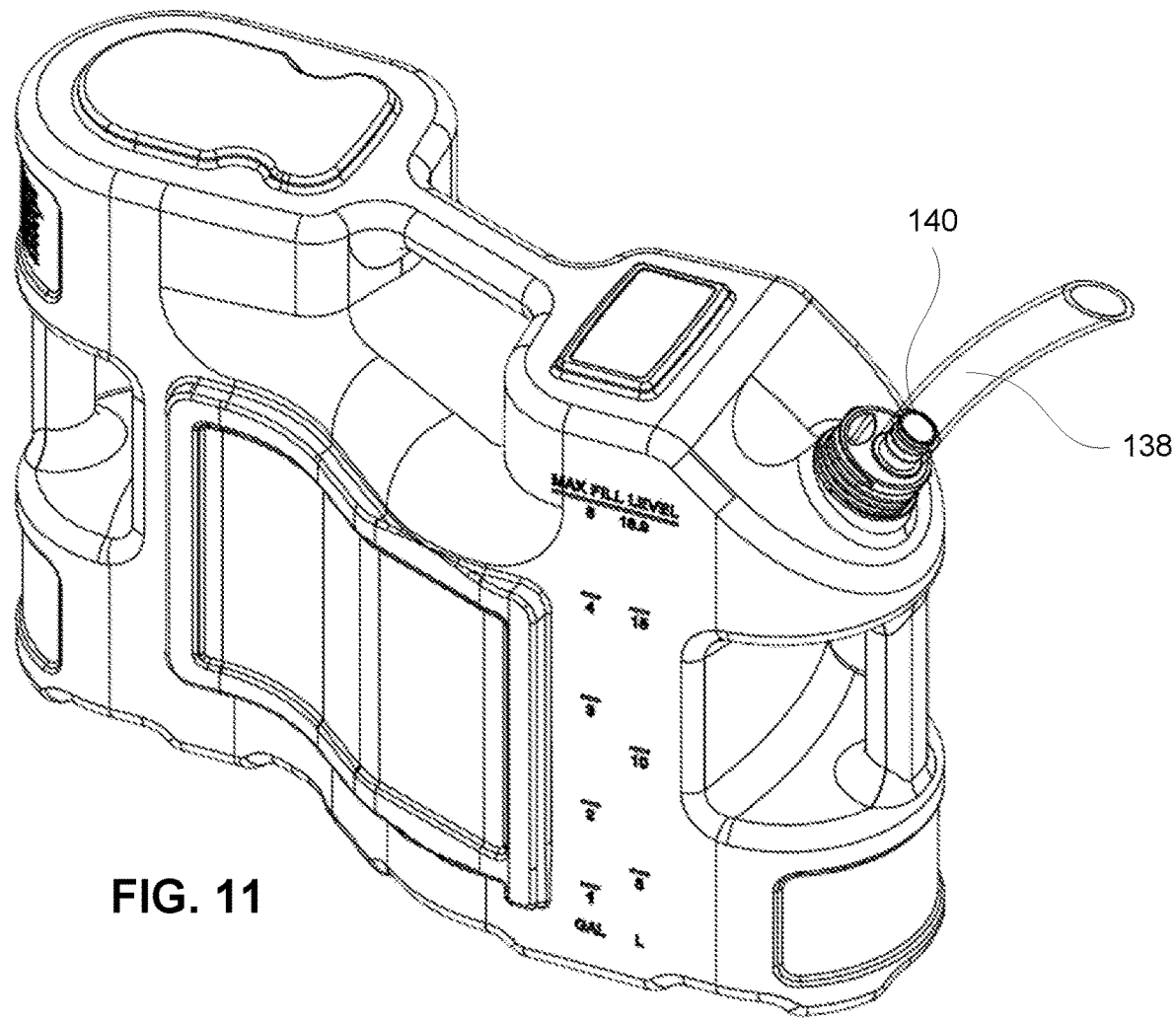
FIG. 11 is a perspective view of the container with the dispenser tube in the use configuration.
Figure 12:
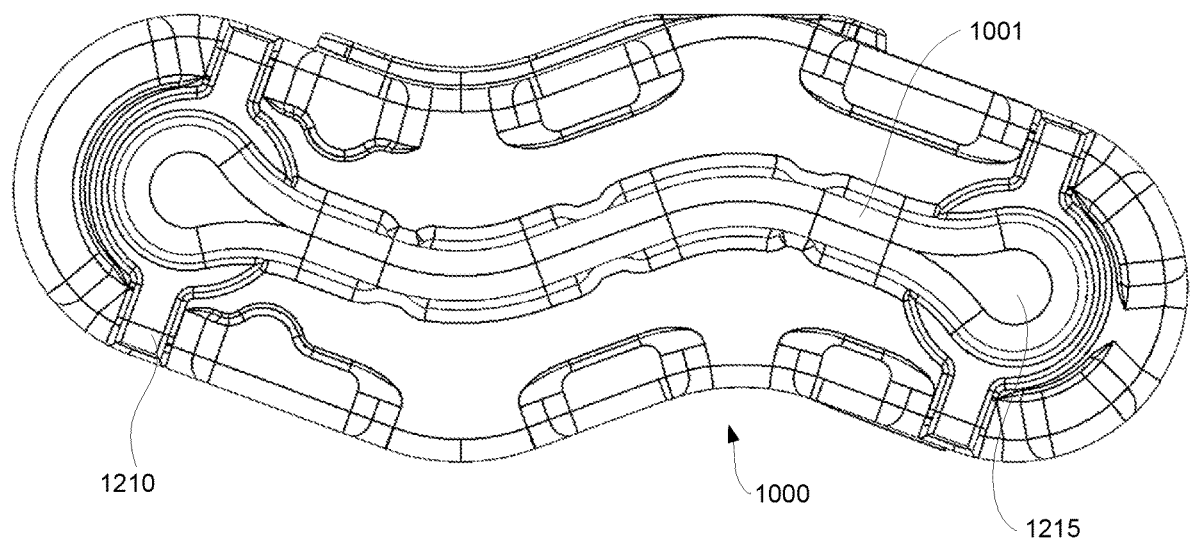
FIG. 12 is a bottom view of a container that is configured to receive a securing clip.
Figure 13:
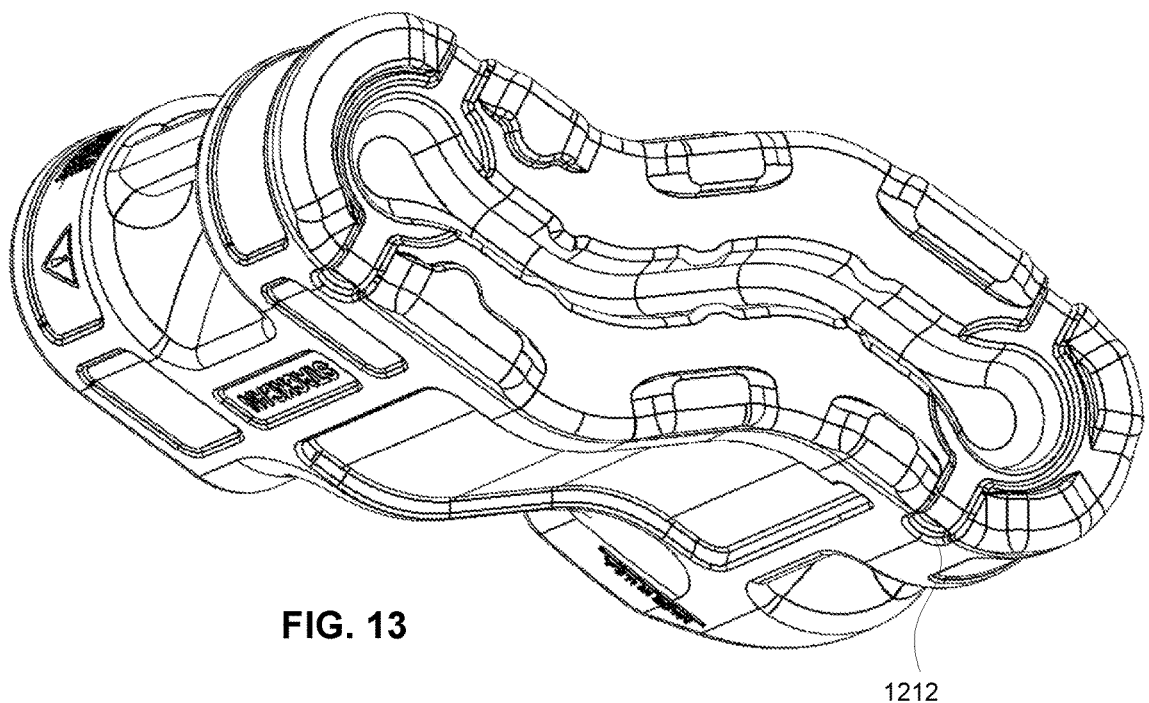
FIG. 13 is a bottom perspective view of the container of FIG. 12.
Figure 14:
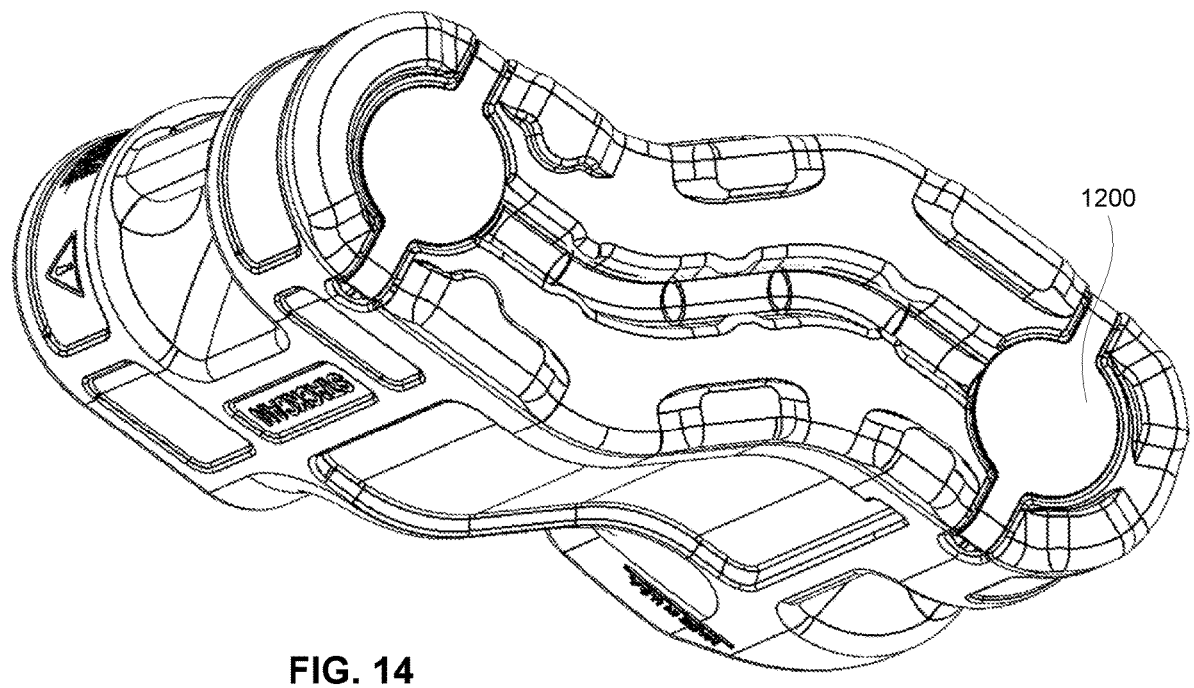
FIG. 14 is a bottom perspective view of the container of FIG. 12 with clips and tubes installed in storage.
Figure 15:
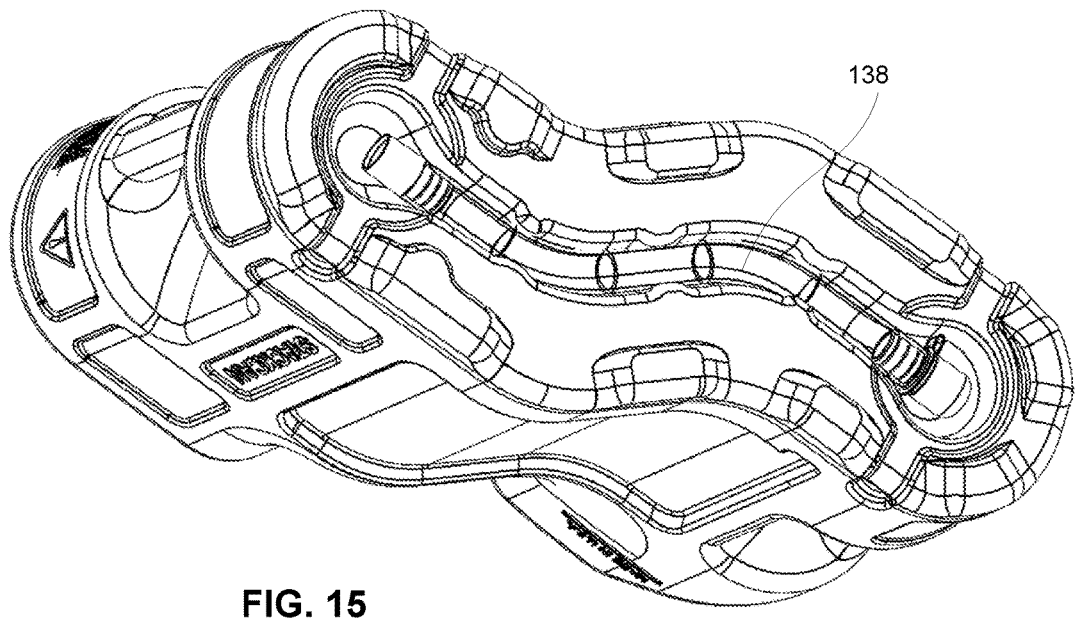
FIG. 15 is a bottom perspective view of the container of FIG. 12 with the tubes installed in storage but clips removed.
Figure 16:
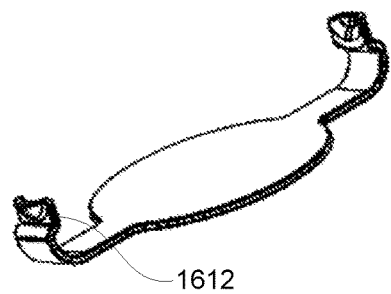
FIG. 16 is a perspective view of the clip for the container of FIG. 12.
Figure 17:
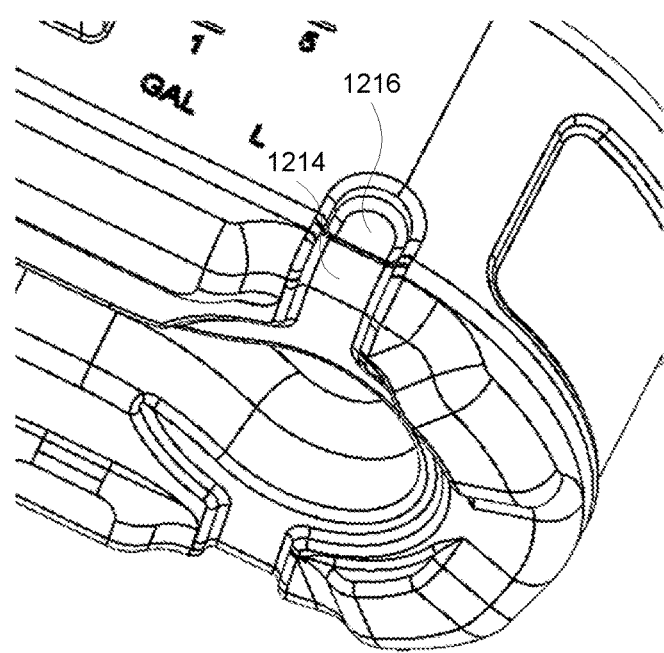
FIG. 17 is a bottom detail perspective view of the container of FIG. 12 with the tubes and clip removed.
Figure 18:
FIG. 18 is a side view of the clip for the container of FIG. 12.

The underside of the container as shown in FIG. 8 has the tube 138 held in recess 101, which generally extends along the majority of the length of the bottom of the container and follows the path of the outer walls in the undulating pattern. However, other shapes and paths of the recess 101 can be used. In the configuration shown, a larger outer tube 138 has an inner smaller tube 138a fit therein such that two tubes are stored. The tubes are removed in FIG. 9 and in the embodiment shown, the tubes may be made of a clear plastic. However, other materials can be used. When installed in the recess, the tubes are generally held in a curved configuration. Undercut surface at one of the narrowing protrusions 142 helps hold the tubes 138/138a in a snap or interference fit manner as the width of the recess 101 at the undercut surface 142 is slightly smaller than the tube diameter and the part of the recess 101 deeper into the recess 101 beyond the undercut surface 142 is wider such that the tube can be pressed past the undercut surface 142 and retained in the recess 101. The user can then remove the tubes, potentially by pulling on connector 140 or 140a to take the tubes out of the recess. FIG. 11 shows the connector 140 installed in the vent 118 and the tube 138 allows for precise pouring of the contents out of the container 100.

FIGS. 12-18 show a container 1000 and features thereof that provide for a retainer clip 1200 to assist in holding the tubes 138/138a and various dispensers in a storage position in the recess 1001. The recess 1001 has end portions 1015 that are generally in the shape of the bottom surface of the clip 1200. This ensures that when installed, the clip does not interfere with stacking of the container, especially in the vertical orientation (the horizontal stacking orientation would generally involve stacking the containers of FIGS. 14 and 15 on top of each other generally in the orientation shown). End portions 1015 have side channels 1210 that connect with channels 1212 in the side walls of the container 1001 to form a channel of varied depth that curves around the outer edge of the container 1001 where the bottom and side walls meet. The recess 1212 has a first depth 1214 close to the intersection of the bottom/side walls and a deeper second depth 1216 where the retaining part 1616 of the clip 1200 fits in. The curved part 1614 of the clip 1200 fits around the outer edge of the container 1001 where the bottom and side walls meet sits in the channel defined by the channels 1210/1212. The clip 1200 includes a catch 1618, which allows a user to easily remove the clip 1200 to remove or store the tubes 138/138a or other dispenser in the channel. When installing the clip 1200, the inward facing ends at 1616 exert an inward force due to bending of the clip in the outward direction as the retaining part 1616 passes over the first depth 1214 and snaps back as the retaining part 1616 passes into alignment with the channel 1212 at the second depth 1216.

As is also shown, the end portions 1015 of the recess 1001 are wider than the straight and curved portions connecting the end portions, which may enable wider dispenser nozzles to be stored in the container with the tubes. For example, a shower head type nozzle could be connected to one end of the tube and may be designed to fit in an end portion 1015 where the clip 1200 covers and secures that larger nozzle.

The container 100 may be manufactured by blow molding whereas the vent 118 may be manufactured by injection molding. In this manner, the vent 118 can be removed from the container 100 by pulling it out of the orifice 117. When the tube 138 is stored, a screw cap can seal the container 100 either with or without the vent 118. Therefore, in manufacturing, the container and vent may be made and the vent 118 later installed by inserting it into the orifice 117 of the container 100. In some embodiments, the vent 118 is bonded to the container 100 once installed, for example by a glue or by heating/fusing the plastic parts.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A container dispenser system comprising:
    a container having an orifice;
    a first dispenser fitted into the orifice having at least first and second openings, the first opening is configured to allow liquid to exit the container there through and the second opening is configured to allow fluid to enter the container there through;
    a second dispenser that is configured to connect to the first opening in a using configuration;
    a recess positioned in an outer surface of the container and the second dispenser is configured to disconnect from the first opening and fit into the recess in a storage configuration, wherein the recess has two end portions and a centerline defined there between;
    at least one clip configured to attach to the container transverse to the recess such that the at least one clip retains the second dispenser within the recess without interfering with the container being interlocked and stacked with a matching container;
    at least one portion of the recess is curved such that the centerline curves at least once between the two end portions.

2. The system of claim 1, wherein the first dispenser fits into the orifice such that a cap can be attached to the container to seal the orifice with the first dispenser installed in the orifice.

3. The container dispenser system of claim 1, further comprising:
    a flange positioned on the first dispenser;
    the orifice including first and second sections, the first section positioned outwardly with respect to outward fluid flow from the container with respect to the second section, the first section having a diameter greater than a diameter of the second section such that the flange inserts partially into the orifice at the first section but is prohibited from being inserted into the orifice beyond a location where the first and second sections meet.

4. The container dispenser system of claim 1, further comprising:
    an extension in communication with the second opening of the first dispenser, the extension having a through-hole and extending from a bottom side of the first dispenser away from a top side of the first dispenser such that the fluid entering the second opening passes through both the second opening and the through-hole.

5. The container dispenser system of claim 4, further comprising:
    a hose located inside the container, the hose having a first end configured to be coupled to the extension of the first dispenser and a second end positioned in a handle of the container such that the fluid entering the second opening passes through the hose and is released inside the container at an area near the handle.

6. The container dispenser system of claim 1, wherein the second dispenser includes a connector and a tube member, the connector configured to insert at least partially into the first opening of the first dispenser and the tube member is connected to the connector opposite an end that inserts into the first opening.

7. The container dispenser system of claim 6, wherein the connector has a first section and a second section, the first section is configured to insert into the first opening of the first dispenser and the second section is configured to connect to the tube member, the first section having a first outer diameter greater than a second outer diameter of the second section, the second outer diameter is less than or equal to an inner diameter of the tube member such that the tube member receives the second section.

8. The container dispenser system of claim 1, wherein the recess includes a center portion connected to the two end portions by two respective intermediate portions, each of the two intermediate portions are at least partially curved such that the centerline of the recess curves at least twice between the two end portions.

9. The container dispenser system of claim 1, further comprising:
at least two opposed undercut surfaces located on opposite sides of the recess such that upon insertion of the second dispenser past the at least two opposed undercut surfaces, the second dispenser is retained within the recess.

10. A container dispenser system comprising:
a container having an orifice;
a first dispenser fitted into the orifice having at least first and second openings, the first opening is configured to allow liquid to exit the container there through and the second opening is configured to allow fluid to enter the container there through;
a second dispenser that is configured to connect to the first opening in a using configuration;
a recess positioned in an outer surface of the container and the second dispenser is configured to fit into the recess in a storage configuration, wherein the recess has two end portions and a centerline defined there between;
at least one clip configured to attach to the container transverse to the recess such that the at least one clip retains the second dispenser within the recess without interfering with the container being interlocked and stacked with a matching container;
at least one portion of the recess is curved such that the centerline curves at least once between the two end portions.

11. A container vent dispenser comprising:
a body having a first side and a second side, the first side including at least first and second openings, both of which pass all the way through the body;
the first opening is configured to allow liquid to exit the container there through and the second opening is configured to allow fluid to enter the container there through to equalize pressure due to the liquid that exits the first opening;
the first side including a flange having a first diameter and a segment extending from the flange towards the second side, the segment having a second diameter smaller than the first diameter;
the second side including a first face having at least two voids therein, the at least two voids extending towards the first side a distance less than a distance between the first and second sides such that the at least two voids are not through-holes.

12. The container vent dispenser of claim 11, wherein the vent dispenser is configured to be fitted into an orifice of the container, the orifice having first and second sections, the first section positioned outwardly with respect to outward fluid flow from the container with respect to the second section, the first section having a diameter greater than a diameter of the second section such that the flange of the vent dispenser inserts partially into the orifice at the first section but is prohibited from being inserted into the orifice beyond a location where the first and second sections meet.

13. The container vent dispenser of claim 11, further comprising:
an extension in communication with the second opening and extending from the second side away from the first side and having a through-hole such that the fluid entering the second opening passes through both the second opening and the through-hole.

14. The container vent dispenser of claim 11, wherein the at least two voids are sized and shaped such that a maximum wall thickness of the body is no more than 30% greater than a minimum wall thickness of the body.

15. The container vent dispenser of claim 11, further comprising:
a spout configured to connect to the first opening in a using configuration, the spout having a connector and a tube member, the connector configured to insert at least partially into the first opening and the tube member is connected to the connector opposite an end that inserts into the first opening.

16. The container vent dispenser of claim 15, wherein the spout is configured to fit into a recess of the container in a storage configuration, the recess positioned in an outer surface of the container and having two end portions and at least one curved portion there between such that the recess has a centerline that curves at least once between the two end portions.

17. The container vent dispenser of claim 16, further comprising:
at least two opposed undercut surfaces located on opposite sides of the recess such that upon insertion of the spout past the at least two opposed undercut surfaces, the spout is further retained within the recess.

18. A container for holding and dispensing liquid comprising:
a hollow vessel having an orifice;
a vent dispenser fitted into the orifice comprising:
a body having a first side and a second side, the first side including at least first and second openings, both of which pass all the way through the body;
the first opening is configured to allow liquid to exit the vessel there through and the second opening is configured to allow fluid to enter the vessel there through to equalize pressure due to the liquid that exits the first opening;
a flange positioned on the first side such that the first side has a first diameter that is greater than a second diameter of the second side;
the second side including a first face having at least two voids therein, the at least two voids extending towards the first side a distance less than a distance between the first and second sides such that the at least two voids are not through-holes;
the orifice including first and second sections, the first section positioned outwardly with respect to outward liquid flow from the vessel with respect to the second section, the first section having a third diameter greater than a fourth diameter of the second section such that the flange of the vent dispenser inserts partially into the orifice at the first section but is prohibited from being inserted into the orifice beyond a location where the first and second sections meet;
a spout configured to connect to the first opening of the vent dispenser in a using configuration, the spout having a connector and a tube member, the connector configured to insert at least partially into the first opening and the tube member is connected to the connector opposite an end that inserts into the first opening;
a recess positioned in an outer surface of the vessel and the spout is configured to fit into the recess in a storage configuration, the recess having two end portions and at least two curved portions there between such that the recess has a centerline that curves at least twice between the two end portions.

19. The container of claim 18, further comprising:
an extension in communication with the second opening of the vent dispenser, the extension having a through-hole and extending from the second side of the vent dispenser away from the first side of the vent dispenser such that the fluid entering the second opening passes through both the second opening and the through-hole.

20. The container of claim 18, further comprising:
at least two opposed undercut surfaces located on opposite sides of the recess such that upon insertion of the spout past the at least two opposed undercut surfaces, the spout is retained within the recess.

21. The container of claim 18, further comprising:
at least one clip configured to attach to the vessel transverse to the recess such that the at least one clip retains the spout within the recess without interfering with the vessel being interlocked and stacked with a matching vessel.

22. The container of claim 11 further comprising:
a spout configured to connect to the first opening in a using configuration, the spout is configured to fit into a recess of the container in a storage configuration, the recess positioned in an outer surface of the container;
at least one clip configured to attach to the container transverse to the recess such that the at least one clip retains the spout within the recess without interfering with the container being interlocked and stacked with a matching container.

* * * * *